May 30, 1939.　　R. J. JAUCH ET AL　　2,160,459
LIQUID DISPENSING APPARATUS
Filed April 5, 1937　　7 Sheets-Sheet 1
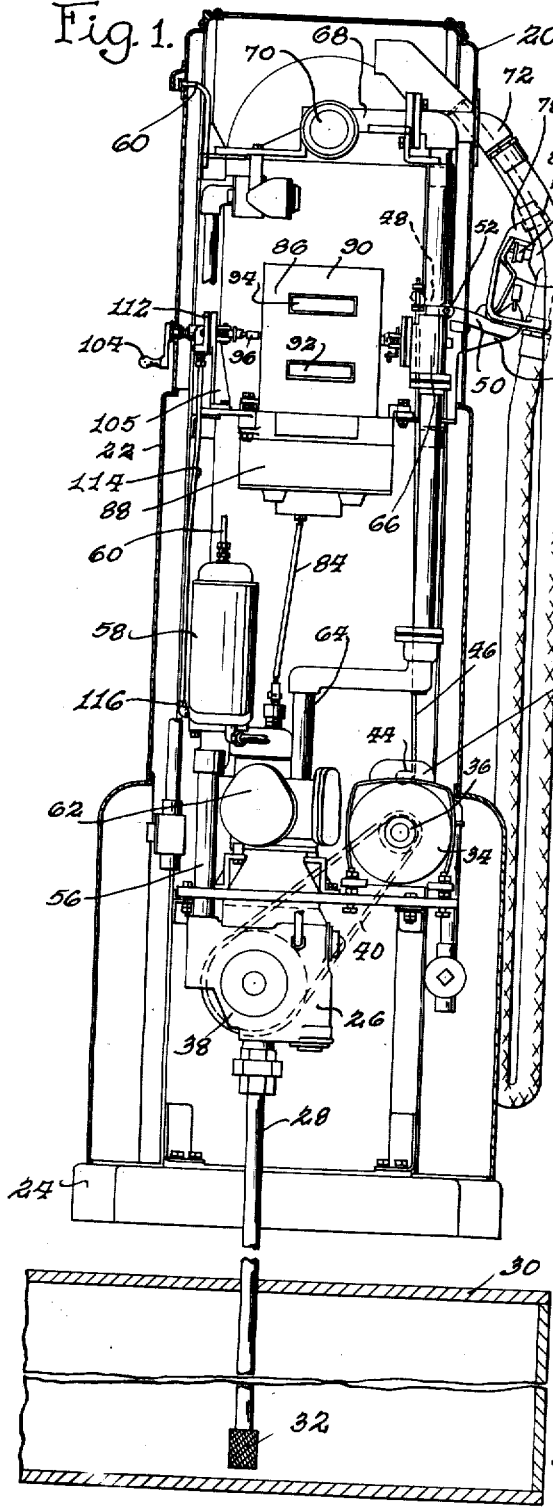
Inventors:-
Robert J. Jauch
William G. Pothamus
Ross H. Arnold
By:- Wilkinson, Huxley,
Byron & Knight
attys.

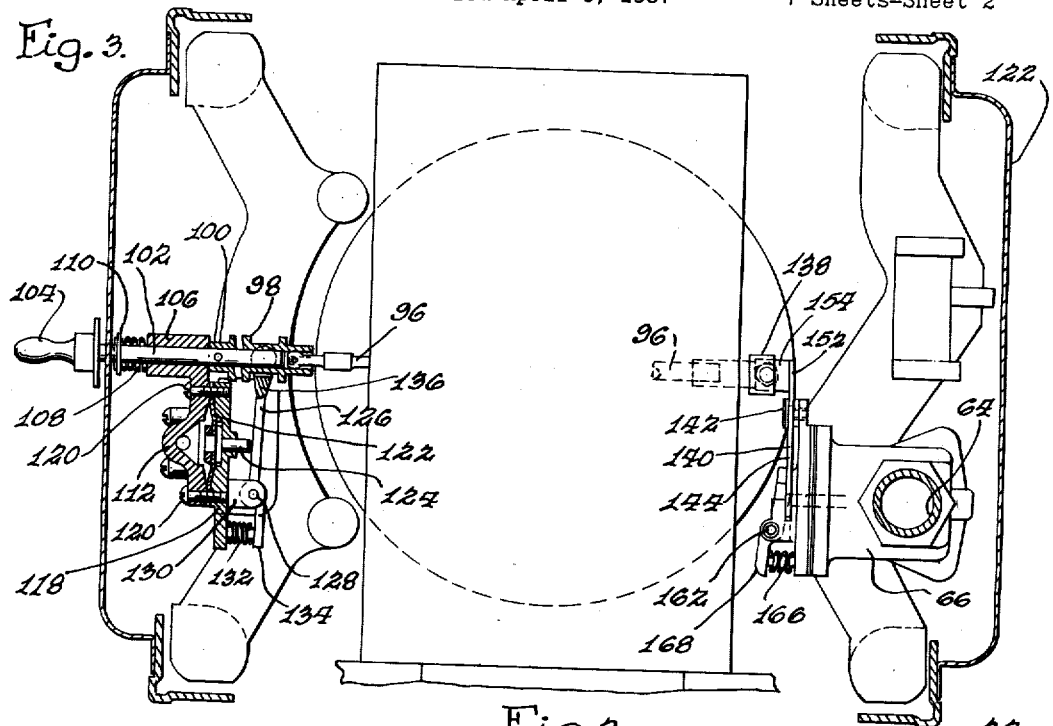

May 30, 1939. R. J. JAUCH ET AL 2,160,459
LIQUID DISPENSING APPARATUS
Filed April 5, 1937 7 Sheets-Sheet 4

Inventors:-
Robert J. Jauch
William G. Polhamus
Ross H. Arnold
By Wilkinson, Huxley, Byron & Knight
Attys.

Inventors:—
Robert J. Jauch
William G. Polhamus
Ross H. Arnold

By Wilkinson, Huxley, Byron & Knight
attys.

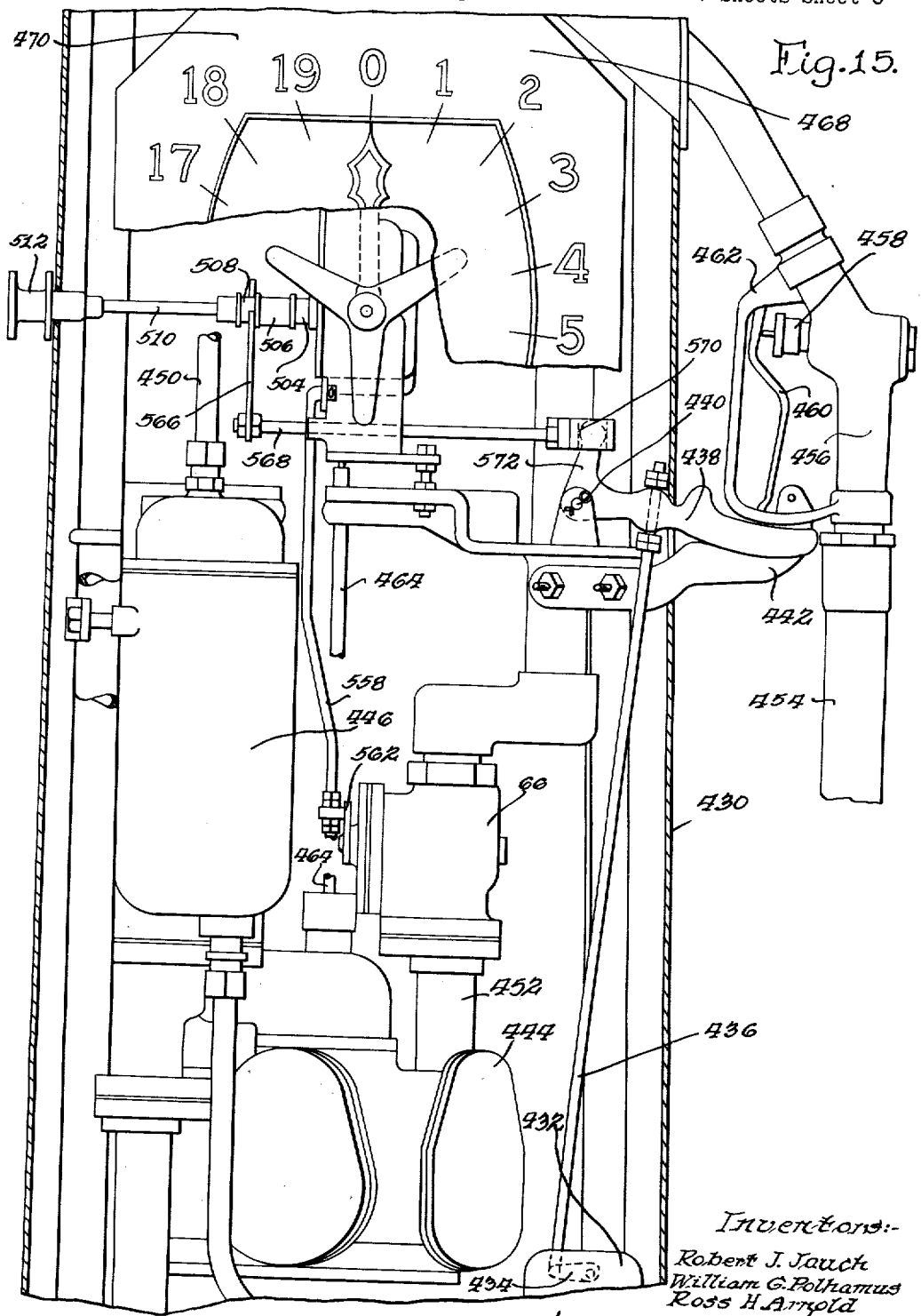

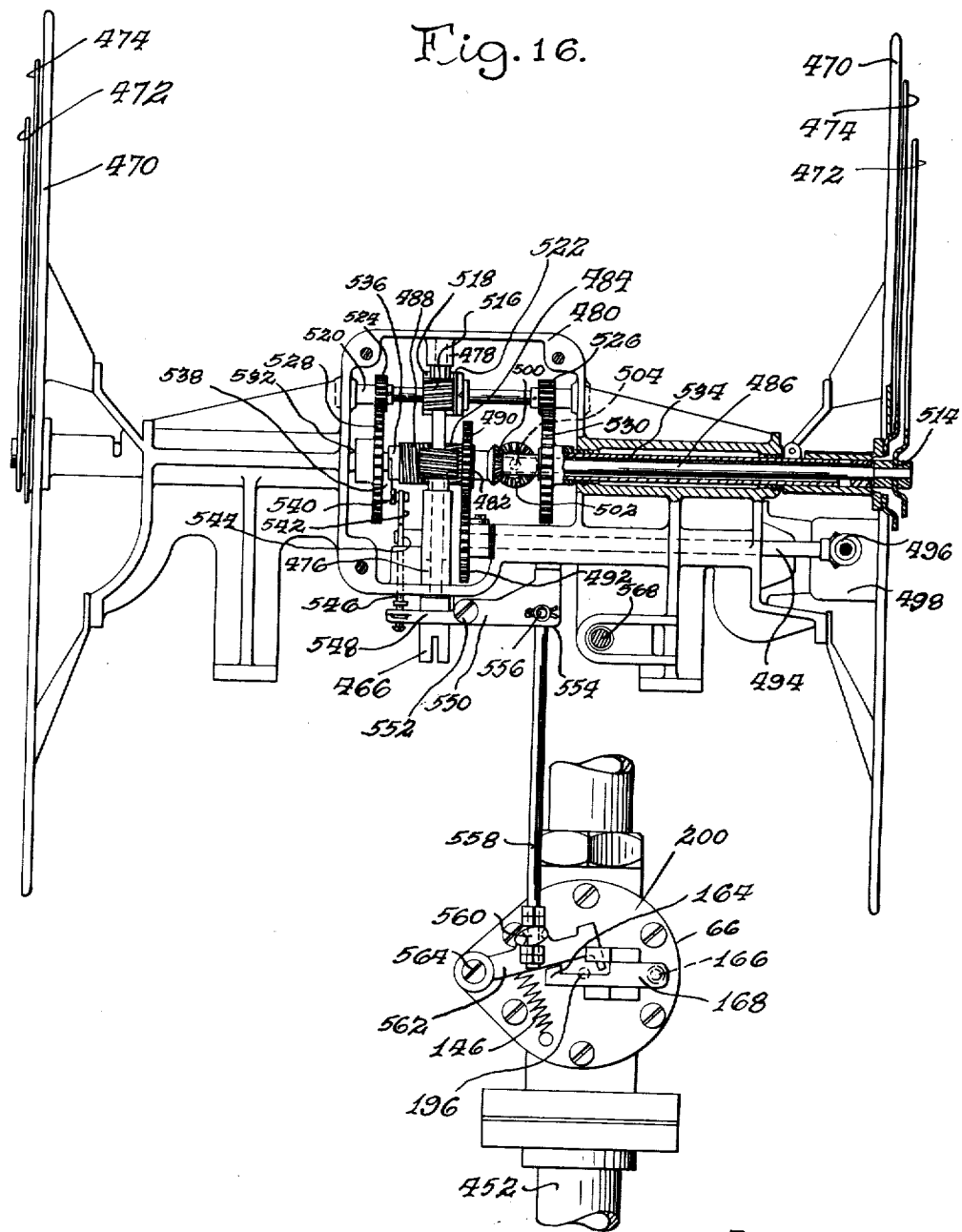

Patented May 30, 1939

2,160,459

UNITED STATES PATENT OFFICE 2,160,459

LIQUID DISPENSING APPARATUS

Robert J. Jauch, William G. Polhamus, and Ross H. Arnold, Fort Wayne, Ind., assignors to The Wayne Pump Company, Fort Wayne, Ind., a corporation of Maryland Application April 5, 1937, Serial No. 135,146

25 Claims. (Cl. 221—95)

This invention pertains to liquid dispensing apparatus and more particularly to reset interlocking mechanism for preventing dispensing of liquid from said apparatus until said apparatus has been reset to a predetermined position.

It is an object of this invention to provide reset interlocking mechanism for preventing liquid from being dispensed from said apparatus until said apparatus has been reset to initial position.

Another object of the invention is to provide reset interlocking mechanism controlled by the pressure of the liquid to be dispensed.

Yet another object of the invention is to provide pressure operated reset disconnecting means operated by the pressure of the liquid to be dispensed.

A further object of the invention is to provide means for reducing the pressure in the hose to zero after dispensing operation has been completed.

A yet further object of the invention is to provide pressure controlled reset interlocking mechanism in a closed system where all stuffing boxes, or other points of possible leakage are eliminated.

A still further object of the invention is to provide a pressure controlled reset interlocking mechanism adapted to be operated by the registering mechanism of the liquid dispensing apparatus.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a sectional elevation through a liquid dispensing apparatus showing one form of interlock applied thereto;

Figure 2 is an enlarged fragmentary elevation taken through the liquid dispensing apparatus illustrated in Figure 1, showing the associated setback mechanism and interlock;

Figure 3 is an enlarged sectional top plan view through the liquid dispensing apparatus illustrated in Figure 1, the same being taken substantially in the plane as indicated by the line 3—3 of Figure 2;

Figure 4 is an enlarged fragmentary side elevation of a portion of the discharge pipe showing the latch valve assembly, the same looking toward the left in Figures 2 and 3 but showing a modified connection of the pressure line operating the reset and clutch disconnecting mechanism;

Figure 5 is an enlarged sectional elevation through one form of latch valve assembly, the same being taken substantially in the vertical longitudinal plane thereof;

Figure 15 is an enlarged fragmentary elevation showing the interlock adapted for use with a clock type of liquid dispensing apparatus;

Figure 16 is an enlarged sectional elevation through the register of the liquid dispensing apparatus shown in Figure 15 showing the pressure interlock in released position connected thereto.

Figure 6:
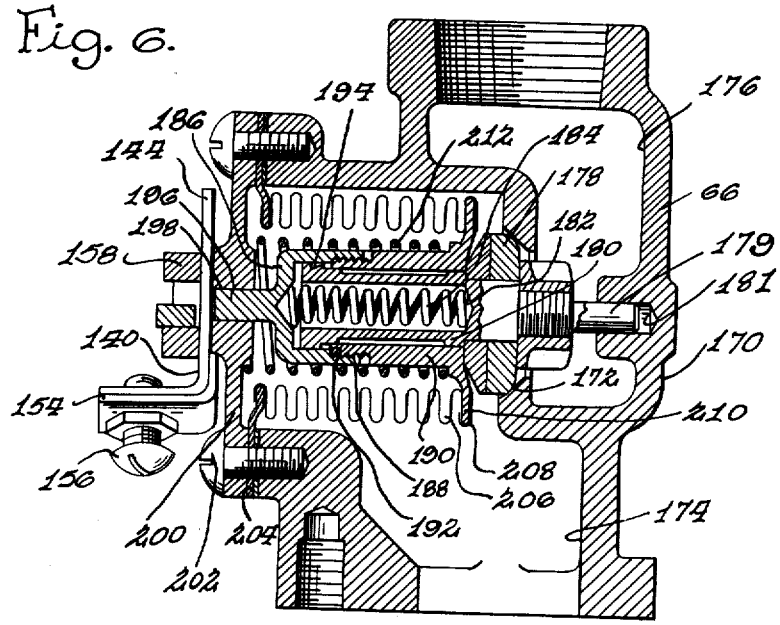
Figure 6 is an enlarged vertical sectional elevation of a modified form of latch valve assembly.

Referring first of all to the liquid dispensing apparatus illustrated in Figure 1, which is of the cost computer type, this apparatus 20 consists essentially of the casing or housing 22 provided with the base 24. Within the casing there is provided a pump 26, shown of the rotary type, said pump being provided with the suction line 28 extending into the source of liquid supply or underground tank 30, the lower end of said suction line being provided with the foot valve 32. The pump shown is adapted to be operated by the motor 34, the pulley 36 of the motor being rotatably connected to the pulley 38 of the pump through the belt 40.

The motor, shown as of the electric type, is operated from any electrical source of supply, the operation of the motor being controlled by the switch 42, the switch arm 44 thereof being connected through the rod 46 to the inner arm 48 of the switch control member 50. Said switch control member 50 is pivoted as at 52 to a suitable support provided in the housing and extends outwardly of said housing adjacent the hose support 54.

The outlet side of the pump 26 is connected through the pipe 56 to the air separator 58, the vented side of said air separator being connected to the vent pipe 60 extending upwardly to exhaust at a raised portion of the casing.

The outlet side of the air separator 58 is connected to the inlet side of the meter 62, said meter being shown as of the displacement type, such as shown in Patent No. 2,144,748 Arnold and Sturm, granted January 24, 1939. The outlet side of the meter is connected to the outlet pipe 64 which extends upwardly and is provided with the latch valve assembly 66, said pipe 64 being connected to the visigauge casting 68. The casting 68 is provided with the visigauge 70 and the outlet pipe 72, said pipe being connected to the dispensing hose 74 provided with the dispensing nozzle 76. Said nozzle is provided with nozzle guard 78 within which is pivotally mounted the hand operating lever 80 for controlling the discharge valve 82 of said nozzle, and said nozzle is preferably provided with a pressure valve at 83 for preventing draining of the hose, said valve opening by the pressure of the dispensed liquid.

The nozzle as shown in Figure 1 is in its supported position, namely, when the switch is open, that is, the outer arm of the switch control member 50 is depressed or in lowered position, the nozzle being supported on the support 54 through the guard. In order to operate the switch 42 to closed position it is necessary to remove the nozzle 76 from its support and raise the switch control member to close the switch 42 to start operation of the motor. The meter 62 is provided with the usual rotary valve or a valve operating the rotatable meter shaft 84, said shaft rotating proportionately to the amount of liquid passing through the meter. The meter shaft 84 is connected to the register 86 which, as shown in Figures 1 to 13 inclusive, is of the computor type and as shown is of similar construction to that illustrated in Patent No. 2,111,996, Slye, granted March 22, 1938, wherein the variator indicated generally at 88 drives the clock or register mechanism indicated generally at 90.

The clock mechanism is provided with the window 92 for visibly indicating the amount of units, such as gallons, dispensed, while the other window 94 shows the computed price of the liquid dispensed.

In the mechanism illustrated in Figures 1 to 4 inclusive, the register 86 is provided with a reset shaft 96, said reset shaft being provided with the clutch member 98 adapted to have clutching engagement with the member 100 provided on the jack shaft 102, said jack shaft 102 being provided adjacent to the outer end thereof with the reset crank 104. The shaft 102 is journaled in the bracket 105 as at 106, and the spring 108 is disposed between the journal 106 and the disc 110 provided on the shaft 102, said spring normally urging the shaft 102 outwardly to a point where the clutch member 100 normally contacts the rear end of the journal 106. The bracket 105 is provided with the pressure housing 112, one side of which is connected to the pipe 114, said pipe being connected to the pressure side of the pump 26 adjacent the inlet side of the meter as at 116. This may be modified somewhat by connection from the line 114 to the pipe 64 above the valve 66 as at 115. The pressure chamber formed in the housing 112 is closed by means of the plate 118 suitably secured thereto as at 120, the flexible diaphragm 122 being secured between the housing 112 and the member 118, the diaphragm being provided with the plunger 124 extending outwardly of the member 118 and in engagement with the declutching lever 126.

The lever 126 is pivoted as at 128 to the pedestal 130 provided on the member 118, the lever being normally urged in a counterclockwise direction by means of a spring 132 interposed between the member 118 and the extension 134 of the lever 126. The lever 126 is provided with the head 136 which is preferably a bifurcated member embracing and engaging the clutch member 98 for slidably operating said clutch member into and out of engagement with the member 100. The opposite end of the reset shaft 96 is provided with the cam 138, the large portion of the cam extending vertically when the registering mechanism is in reset zero position.

The latch valve assembly 66 disposed adjacent to cam 138 is provided with the anvil or locking lever 140 pivoted to the housing of the latch valve assembly as at 142, the inner arm 144 of said member being normally urged downwardly or in a counterclockwise direction, as viewed in Figure 4, by the spring 146 secured to said arm as at 148 and to the valve housing as at 150. The shorter or outwardly extending arm 152 of the lever 140 is provided with the flange 154 underlying the cam 138 and provided with the adjusting screw 156. The inner arm 144 is adapted to have a vertical reciprocatory motion in a slot provided between the latch valve assembly housing and the pedestal 158. The latch member 160 is pivotally mounted on the pedestal 158 as at 162, the shoulder end 164 of said member being adapted to releasably engage the inner arm 144 of member 140 and support said arm in raised or inoperative position. The arm 164 is normally urged toward the housing, that is, to a position underlying the member 144 by means of the coil spring 166 disposed between the outer arm 168 of the latch member and the latch valve assembly housing.

Figure 7:
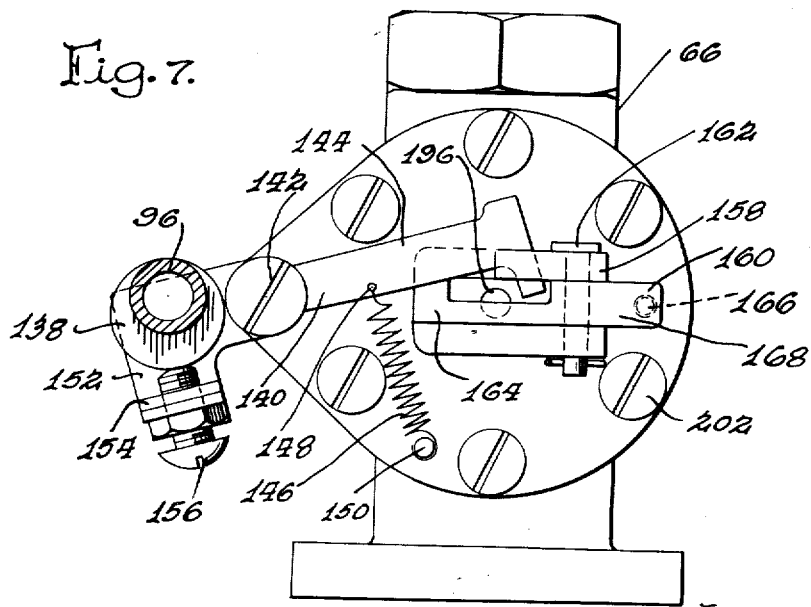
Figure 7 is a side elevation of a latch valve assembly shown in Figure 6, the same being taken looking toward the right as viewed in Figure 6.

The latch valve illustrated in Figures 6 and 7 includes the housing 170 provided with the valve seat 172 interposed between the inlet chamber 174 and the outlet chamber 176 of the valve. The poppet valve 178 is provided with the valve guide 179 guided as at 181 in the housing, said valve being adapted to have seating engagement with the valve seat 172. The valve 178 is also provided with the stem member 180, said stem being provided with the channel or recess 182 in which the expansible coil spring 184 is mounted, said spring being disposed between the member 180 and the member 186. The member 186 is connected through the threads 188 to the member 190, the member 190 being provided with the shoulder 192 and the member 180 being provided with the shoulder 194, a slight clearance being provided between said shoulders whereby the member 180 may have a slight relative movement with respect to the member 186.

The member 186 is provided with the latch member or plunger 196 adapted to extend through a suitable boss 198 provided in the end plate 200 of the valve assembly, said end plate being suitably secured at 202 to the housing 170. Between the end plate and the housing there is provided a plate 204 to which the Sylphon 206 is secured, the other end of the Sylphon being secured as at 208 to the flange 210 provided on the member 190. The Sylphon normally will tend to urge the valve 178 into seating engagement with the seat 172. This is aided by means of the coil spring 212 disposed between the end plate 200 and the flange 210 of the member 190, this coil spring being slightly stiffer than the coil spring 184.

As it is practically impossible, particularly in commercial production, to machine parts to exact and perfect fitting relation to other parts, it is only necessary in this valve assembly that the clearances between the shoulders 192 and 194 be greater than the actual clearances between the end of the plunger 196 and the member 144. In this form of valve assembly, when the member 144 is rotated to a position where it is disposed in the path of the plunger member 196 whereby the member cannot extend outwardly of the end plate 200, it will be appreciated that pressure on the Sylphon will tend to collapse the Sylphon, thus tending to move the member 190 toward the left as viewed in Figure 6. However, as the distance between the shoulder 192 and 194 is greater than the distance between the end of the plunger 196 and the member 144, the valve will not be moved from its seat, being urged toward its seat by the pressure on the back of the valve 178 and additionally being urged toward seating position by means of spring 184.

It will be understood, of course, that when the member 144 is in raised position, such as viewed in Figure 7, that is, after the liquid dispensing apparatus has been set to zero and dispensing operation occurs, liquid pressure on the Sylphon will collapse the Sylphon, moving the member 190 toward the left as viewed in Figure 6, causing engagement between the shoulders 192 and 194, continuing movement of the member 196 outwardly of the housing, causing the valve 178 to become unseated, whereupon liquid may pass from chamber 174 to chamber 176 and thus outwardly of the liquid dispensing apparatus.

This form of interlocking valve assembly has another very important function. In the liquid dispensing apparatus now in use it is required in certain territories that the pressure in the hose be reduced a predetermined amount after the pump has become inoperative and the hose is hung up on its support. For this specific purpose a valve assembly is usually provided in the outlet line 64. With this form of interlock this valve assembly, which is of rather expensive construction, is eliminated.

With the form of liquid dispensing apparatus illustrated herein, and using the valve assembly shown in Figures 6 and 7, when dispensing operation has ceased, should any expansion of the liquid occur in the hose, or should the pressure be substantially in excess of zero, then the liquid pressure will cause the valve 178 to open sufficiently to permit the pressure to be reduced to substantially zero. Thus this form of interlock meets a plurality of desirable and compulsory requirements.

In the modified form of latch valve assembly illustrated in Figure 5, the housing 214 is provided with the inlet chamber 216 and the outlet chamber 218, the chambers being separated by means of the valve seat 220. The poppet valve 222 is adapted to have seating engagement with the valve seat 220, the valve being provided with the guide stem 224 slidably guided as at 226. The valve member 222 has one end of the Sylphon 228 secured thereto as at the flange 230, the other end of the Sylphon being secured to the plate member 232 retained between the valve housing 214 and the end plate member 234, said members being secured to the valve housing through suitable means 236.

The valve 222 is normally urged towards closed or seated position by means of a coil spring 238 disposed between the valve member and the member 234. The other end of the valve stem 224 is provided with the latching plunger 240 slidably guided in the boss 242 of the member 234, the member 240 being so proportioned and shaped that the latching end of the plunger extends downwardly and slightly outwardly of the boss 242 whereby substantially a wedge end 244 is provided. In this form of construction, when the member 144, which is understood as provided on this construction in a manner already described with respect to Figures 6 and 7, is in position to lock the valve 222 in seating position, the wedging section between the member 244 and the member 144 will prevent the liquid pressure from collapsing the Sylphon, thus preventing the valve from opening.

In operation of the liquid dispensing apparatus and associated mechanisms illustrated in Figures 1, 2, 3, 6 and 7, assuming the registering mechanism to be in reset zero position such as illustrated in Figure 1, when it is desired to dispense liquid it is of course necessary to remove the nozzle 76 from the support 54 where it may be inserted in the receptacle to be filled, such as the fill opening of a motor vehicle tank. The switch control member 50 may then be raised, causing downward movement of the rod 46 to close the switch 42. Closing the switch 42 causes operation of the motor 34 to rotate the pump 26 to draw liquid through the pipe 28 from the source of liquid supply 30, forcing the liquid upwardly through the pipe 56 into the inlet side of the meter. The liquid is forced through the meter, causing rotation of the meter shaft 84, the liquid passing outwardly through the pipe 64, through the latch valve assembly 66, through the sight gauge 70, and outwardly through the hose 74 and nozzle 76, it being understood the nozzle valve has been moved to open position by the lever 80.

Rotation of the shaft 84 causes operation of the registering mechanism 86 to cause the volume indications to appear in the window 92, and the computed cost indications to appear in the window 94. The liquid being pumped through the pipe 56 causes pressure in the line 114. Pressure in the line 114 causes pressure on the diaphragm 122, moving the diaphragm toward the right as viewed in Figure 3, whereupon the plunger 124 will move the lever 126 toward the right as viewed in said figure, disconnecting the clutch member 98 from the clutch member 100, whereupon in normal operation rotation of the reset crank 104 will not affect any operation of registering mechanism 86 unless the operator willfully moves the reset crank inwardly against the spring 108 to cause clutching operation of the members 100 and 98. The liquid to be dispensed through the pipe 64 enters the inlet chamber 174 of the valve assembly 66.

The liquid pressure on the Sylphon 206 collapses said Sylphon, depressing the spring 212, and the member 190 will be moved toward the left as viewed in Figure 6, until the shoulder 192 engages the shoulder 194, at which time the valve 178 will be unseated, and liquid will be permitted to pass into the outlet chamber 176, and thence outwardly to be dispensed. Movement of the member 190 toward the left as viewed in Figure 6 will of course cause the plunger 196 to be moved toward the left. The member 144 will be in a raised position such as shown in Figure 7, being supported in this position by the sloping end shoulder of the latch member 160. The end of the member 144 will be spaced from the plunger 196 when it is locked out of interlocking position. The dispensing operation, however, will cause the plunger 196 in its outward movement to engage the member 160 to move said member outwardly to release the member 144 from the shoulder of the member 160, permitting said member to be moved downwardly by the spring 146 to be supported on the extended plunger 196. The member 164 will move against the spring 166 and be held against the face of the member 144, thus locking it out of supporting relation to the member 144.

In this operation it is of course understood that the latch portion of the cam 138 as seen in Figure 7 is in a raised vertical position, that is, is 180 degrees from the position shown in Figure 7. After the required amount of liquid has been dispensed, and the switch control member 50 has been lowered to open the switch 42, the liquid pressure dropping in the line 64 will permit the valve 178 to be seated on the seat 172 by the natural resilience of the Sylphon 206, and by the action of the spring 212. Movement of the valve 178 toward the right as viewed in Figure 6 will withdraw the plunger 196 inwardly of the boss 198, thus causing the member 144 to be further moved downwardly to a position where it is disposed to wholly block the plunger 196 to prevent it from moving outwardly of the boss 198 should the pump be again started.

The member 144 is limited in its downward or clockwise movement as viewed in Figure 7 by engagement of the stop 156 with the small side of the cam 138, and the member 144 is relieved of strain laterally by its movement in the slot provided in the pedestal 158. So long as the member 144 is in a position to prevent outward movement of the plunger 196, no liquid can pass through the valve assembly 66, as the valve 178 is locked on its seat 172 against any movement by pressure in the inlet chamber 174. It is noticed, however, that pressure in the hose is relieved as the pressure acting from the outlet chamber 176 on the valve 178 will permit the valve to open slightly due to the clearance provided between the end of the plunger 196 and the member 144, but as this clearance is less than the clearance between the shoulders 192 and 194, pressure applied to the Sylphon from the inlet chamber 174 will cause the plunger 196 to engage the member 144 before engagement between the shoulders 192 and 194, thus preventing the valve 178 from being opened.

When it is desired to again dispense liquid it is first necessary to reset the registering mechanism 86 to zero. When the switch 44 is opened, the liquid pressure will drop in the line 114, permitting the diaphragm 122 to be moved toward the left as viewed in Figure 3, thus retracting the plunger 124, whereupon the spring 132 will move the lever 126 in a counterclockwise direction to re-engage the clutch members 98 and 100. Thus, the reset crank 104 can be rotated to reset the registering mechanism 86 to zero. Resetting the registering mechanism 86 to zero will cause rotation of the cam 138 mounted on said shaft through 360 degrees. Rotation of the cam 138 will cause counterclockwise movement of the lever 140 against the action of the spring 146, such as shown in Figure 7, the cam 138 being shown in its lowermost position in this figure before the registering mechanism has reached its zero position. Lifting the portion 144 of the lever 140 will remove the member 144 from its locking position in way of the plunger 196, and as it raises the member 144 above the cam end of the member 160, the spring 166 will return the cam end to supporting position below the member 144, thereupon returning the latch valve assembly to a position where liquid can again be dispensed through the valve assembly 66. Where the line 114 is connected as at 115 (Figure 4) to the pipe 64, the clutch member 98 is not operated unless liquid passes through the valve 66.

Figure 9:
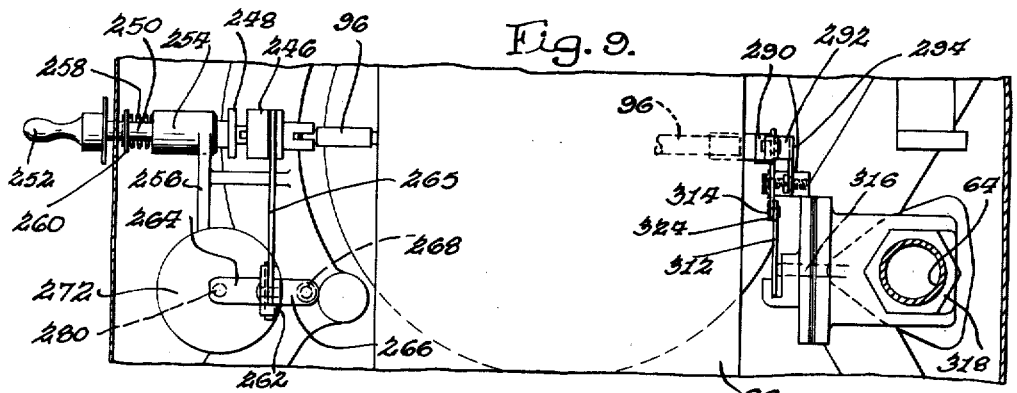
Figure 9 is a fragmentary enlarged top plan view of the modification illustrated in Figure 8, the same corresponding to Figure 3.
Figure 8:
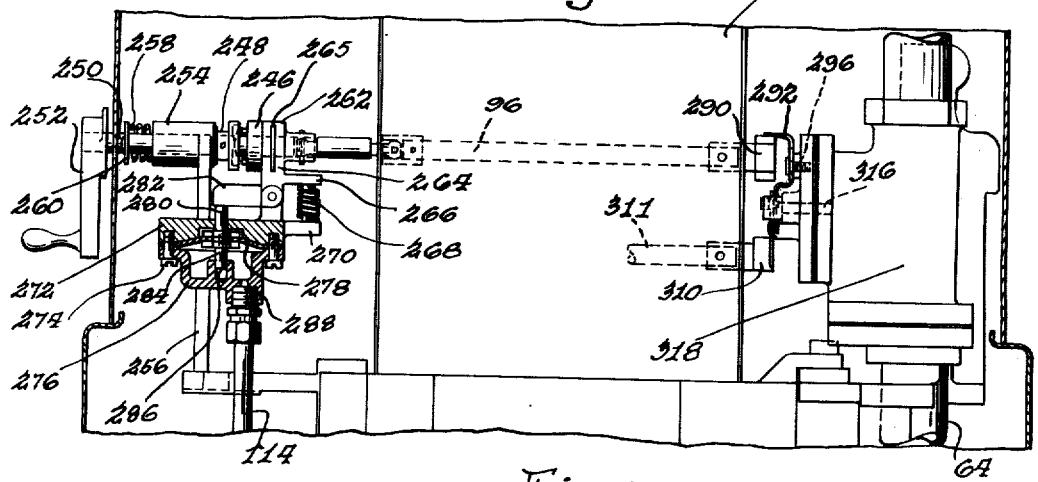
Figure 8 is a sectional elevation corresponding to Figure 2 showing a modified form of interlocking device.
Figure 10:
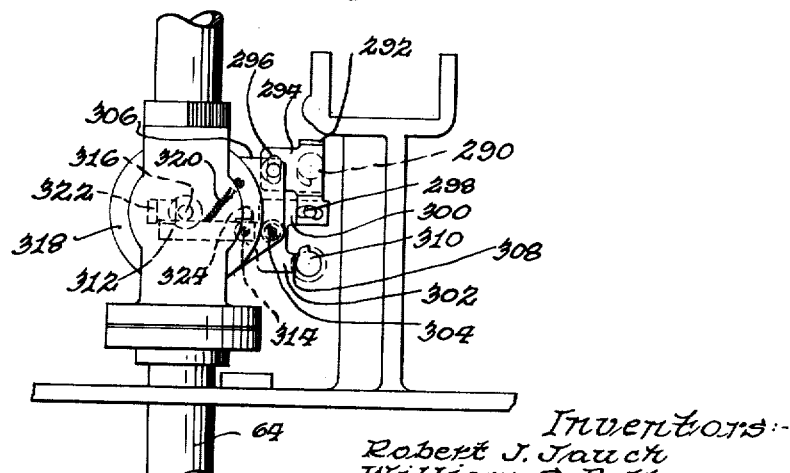
Figure 10 is an enlarged side elevation corresponding to Figure 4 of the latch valve assembly illustrated in Figures 8 and 9, the same looking toward the left as viewed in said figures.

In the form of interlocking mechanism illustrated in Figures 8, 9 and 10, it will of course be understood that pumping and discharge mechanism is employed similar to that described with respect to Figure 1. In this form of the device the registering mechanism 86 is provided with the reset shaft 96 provided with the clutch member 246 adapted to have clutching engagement with the adjacent clutch member 248 mounted on the jack shaft 250 to which the reset crank 252 is secured. The jack shaft 250 is journalled in the bearing 254 provided on the bracket 256, and the spring 258 is interposed between the bearing and the disc 260 mounted on the jack shaft normally tending to urge the clutch member 248 against the bearing 254.

The arm 262 of the bell crank 264 is provided with the link 265, one end of which is bifurcated and engages the clutch member 246, the arm 262 being provided with the arm 266 engaged by the spring 268 normally urging the bell crank in a counterclockwise direction as viewed in Figure 8, the spring being seated upon the bracket 270 provided on the member 272. The member 272 is secured as at 274 to the housing 276, the flexible diaphragm 278 being interposed between the member 272 and the housing 276. The diaphragm is provided with the outwardly extending plunger 280 engaging the arm 282 of the bell crank for controlling operation thereof, the plunger being provided with a suitable extension 284 adapted to have sliding movement in the guide 286. The pressure pipe 114 in this instance is secured as at 288 to the housing 276 for supplying pressure to the underside of the diaphragm.

The reset shaft 96 on the opposite side of the register 86 is provided with the cam 290 adapted to have cooperative engagement with the flange 292 of the slide 294, said slide being vertically guided through pin and slot means 296. The bottom portion of the slide is loosely pivoted as at 298 to the upper arm 300 of the lever 302, the pin and slot connection at 298 being through an arcuate slot to permit relative angular motion between the slide 294 and the lever 302. The lever 302 is pivoted as at 304 to the bracket 306, the lever being provided with the lower arm 308 adapted to be engaged by the cam 310 provided on the shaft 311 which, in the registering mechanism shown, is the shaft upon which the gallon wheels are mounted, said wheels being rotatable to show the volume of liquid dispensed. When the registering mechanism is at the zero position preparatory to dispensing liquid, the large part of the cam 290 is in lowered position, and the large part of the cam 310 is in its top or vertical position, all as shown in Figure 10.

A locking arm 312 is pivotally mounted as at 314 to the lever 302 and is disposed adjacent the plunger 316 of the latch valve assembly 318, the internal mechanism of said valve assembly being similar to that already described with respect to Figures 5 and 6. The arm 312 is urged upwardly as viewed in Figure 10 by means of the spring 320, one end of which is connected to said arm and the other end of which is connected to the valve housing, the arm being adapted to have a vertical movement in the guide 322, said arm being prevented from rotating vertically with respect to the lever 302 by overlying shoulder 324.

Assuming the register 86 to be in zero position and it is desired to discharge liquid from the liquid dispensing apparatus, as before, the hose nozzle 76 is removed from the support 54 and the switch operating member 50 is moved to a raised position, moving the rod 46 downwardly to close the switch 42 to start the motor. Starting the motor operates the pump 26 to draw liquid from the source of liquid supply 30, the liquid being discharged from the pump 26 through the pipe 56, thus causing pressure to be built up in the line 114. Building up pressure in the line 114 causes pressure to be applied to the underside of the diaphragm 278, moving the plunger 280 upwardly as viewed in Figure 8. Moving the plunger upwardly causes rotation of the bell crank 264 in a clockwise direction against the spring 268, thus causing disengagement between the clutch members 246 and 248.

The liquid passes through the meter 62 causing rotation of the meter shaft 84 to operate the register 86, causing the gallon indications to appear in the window 92, and the computed price to appear in the window 94. The liquid passes through the discharge pipe 64, through the sight gauge 70 and outwardly through the hose 74, it being understood that the valve controlled by the lever 80 has been opened and liquid is being discharged into the desired receptacle, such as the gasoline tank of a motor vehicle.

Liquid is permitted passage through the housing 318 as the member 312 is not disposed in blocking relation to the plunger 316, said plunger being similar to the plunger 196. After any desired amount of liquid has been dispensed and the switch member 50 has been lowered to open the switch 42, pressure will decrease in the line 114 to permit the spring 268 to move the bell crank 264 in a counterclockwise direction to re-engage the clutch members 246 and 248, whereby the registering mechanism 86 may be readily reset to zero by rotation of the reset crank 252 through 360 degrees.

The pressure having dropped in the line 64, the valve in the valve housing 318 will be seated and the slide member 294 will have moved to lowered position by a slight rotation of the lever 302, the arm 312 being disposed in blocking relation to the plunger 316 by the spring 320, preventing unseating of the valve in the valve housing 318. Thus, no liquid can be dispensed until the registering mechanism has been reset to zero. In resetting the mechanism to zero, the cam 290 will engage the flange 292 to raise the slide 294, thus revolving the lever 302 to move the member 312 out of blocking relation with respect to the plunger 316.

Figure 11:
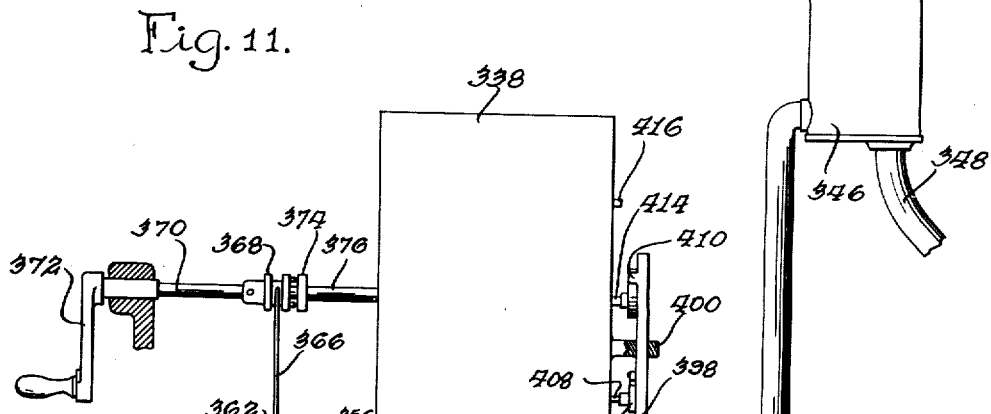
Figure 11 is an elevation, shown more or less diagrammatically, of a different form of interlocking mechanism embodying the invention and wherein the interlock is controlled from the reset shaft and volume part of the register.
Figure 13:
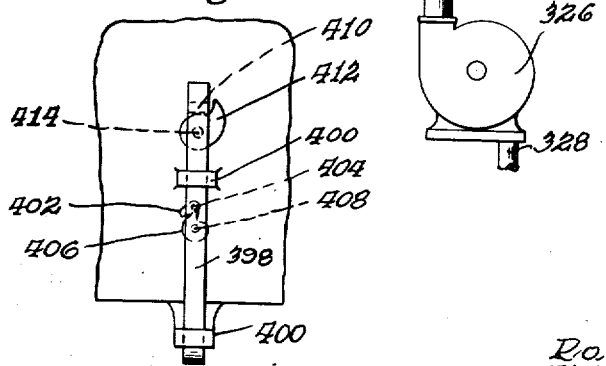
Figure 13 is a side elevation corresponding to Figure 12 showing the latch member in released or interlocking position.
Figure 12:
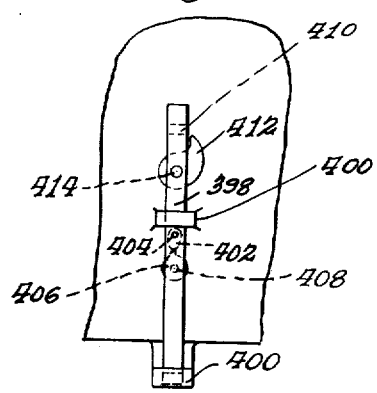
Figure 12 is a side elevation of the locking bar of the interlock shown in Figure 11, the same being shown in a position permitting liquid to be dispensed from the device shown in Figure 11.

In the construction shown in Figures 11 to 13 inclusive, the suction side of the pump 326 is connected through the pipe 328 to a suitable source of supply such as shown in Figure 1. The outlet side of the pump is connected through the pipe 330 to air separator 332 and to the meter 334, the meter being provided with a rotatable meter shaft 336 connected to the registering mechanism 338, which is of the cost and amount type, such as already described.

The outlet side of the meter is connected to the pipe 340 provided with the locking valve assembly 342, the outlet side of which is connected to the outlet pipe 344, which in turn is connected to the visigauge 346, to which the hose 348 is connected, said hose being provided with a suitable nozzle and valve control therefor, such as already described, it being understood that there is a switch mechanism controlling operation of the pump through a prime mover, as an electric motor, such as already described.

The pipe 330 is connected to the pressure line 350, which in turn is connected to the Sylphon 352 disposed in the housing 354, the Sylphon being urged against the pressure by means of the coil spring 356 disposed in said housing. The Sylphon is provided with the member 358 pivotally connected as at 360 to the lever 362, said lever being pivoted at 364 to the bracket 365 provided on the housing 354. The upper end of said lever is provided with the flexible member 366, preferably having a bifurcated end disposed in operating engagement with the clutch member 368. The clutch member 368 is mounted on the jack shaft 370, the end of which is provided with a reset crank 372. The clutch member 368 is adapted to have clutching engagement with the clutch member 374 mounted on the reset shaft 376 of the register mechanism 338.

The lower end of the lever 362 is pivotally connected as at 378 to the link 380, the opposite end of said link being loosely connected as at 382 to the interlocking lever 384 mounted on the valve shaft 386, said shaft extending into the valve housing 342, and being provided with the valve member 388 adapted to have seating engagement on the seat 390 in the valve housing, separating the inlet chamber 392 from the outlet chamber 394 thereof, it being seen that the valve is adapted to seat against the pressure in the pipe 340. The upper end of the lever 384 is provided with the arcuate cam portion 396, which cam portion is adapted to have locking cooperation with the locking bar 398, said bar having sliding movement in the spaced guides 400.

The lower end of the bar 398 is beveled to provide a more ready engagement with the cam 396, and the bar is provided with the dog 402, pivoted thereto as at 404 and adapted to be engaged by the cam 406 mounted on the shaft 408 which controls the gallon indications, it being noted that the large portion of the cam is disposed in vertical position when the gallon indications are in the zero position, the shaft 408 revolving with the gallon indications. The upper portion of the bar 398 is provided with the shoulder 410 adapted to have cooperative engagement with the cam 412 mounted on the extension 414 of the reset shaft 376, the large portion of the cam 412 being disposed in a vertical position, but in such position that the shoulder 410 is cleared when the registering mechanism 338 is set at zero registration.

Thus, assuming that the registering mechanism 338 is in a zero position and liquid is to be dispensed, starting the pump causes pressure to be built up in the line 350, whereupon the Sylphon 352 elongates against the spring 356, moving the lever 362 in a counterclockwise direction, thereby causing declutching of the members 368 and 374. Rotation of the shaft 336, of course, is caused by the passage of liquid through the meter, whereupon the register 338 will indicate the number of units dispensed and the cost thereof. When the register is in zero position, it is understood that the interlocking bar 398 is in the raised position, such as shown in Figure 12. In this position the lower end of the locking bar is raised out of engagement with the cam 396, and as the lower end of the lever 362 has moved the link 380 toward the right, as viewed in Figure 11, the liquid pressure against the valve 388 will open the valve to permit dispensing operation.

Any movement of the meter shaft 336 to operate the registering mechanism 338 will cause rotation of the shaft 408, causing disengagement between the cam 406 and the dog 402, permitting the interlocking bar 398 to move downwardly, engaging the right side of the cam 396, thus insuring that the valve will remain open. However, when the pump has been stopped the pressure will fall in the line 350, whereupon the spring 356 and the natural spring of the Sylphon 352 will cause the lever 362 to be moved in a clockwise direction, as viewed in Figure 11, causing re-engagement of the clutch members 368 and 374.

Movement of the lever 362 in a clockwise direction will move the link 380 toward the left as viewed in Figure 11, whereupon the valve 388 will be moved to a closed position where it is locked in closed position by engagement of the cam 396 by the interlocking bar 398 on the left side of said cam. Thus, if the pump is again put in operation, no liquid can pass through the device as the interlocking bar 398 will maintain the valve 388 in closed position, inasmuch as the connection between the link 380 and the member 384 is a loose connection at 382. However, resetting the register 338 causes the cam 412 to engage the shoulder 410 to raise the bar 398, and causes the cam 406 to be moved to the vertical position when the gallon indications are in the zero position, where the dog 402 will engage the raised portion of the cam to maintain the bar in raised position, the cam 412 moving out of engagement with the shoulder 410 at the point that the price indications reach their zero position.

Figure 14:
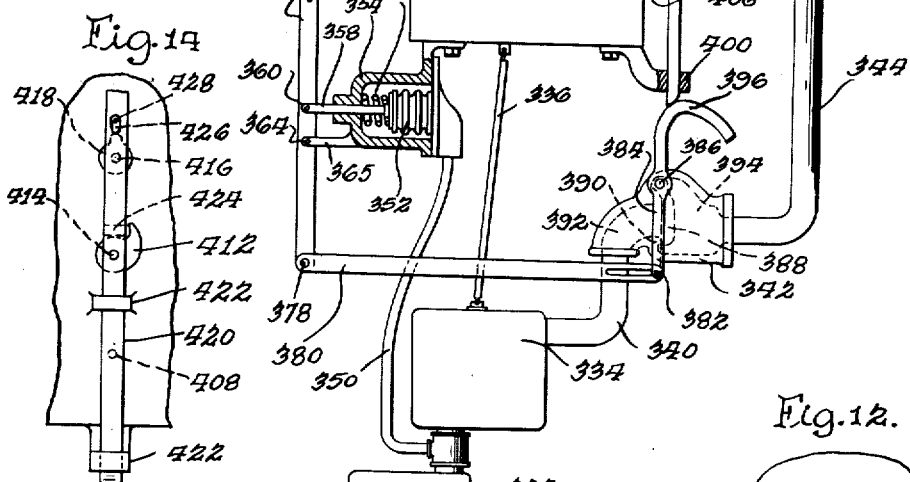
Figure 14 is a side elevation corresponding to Figure 12 of the locking bar showing the same controlled from the reset shaft and the price part of the register.

In the event that it is desired to control operation of the interlock mechanism by the reset shaft and the shaft on which the price indications are mounted, this can be done readily as indicated in Figure 14. It is understood, of course, that the mechanism included in the liquid dispensing apparatus is substantially that as described with respect to Figure 11. The change necessary to adapt that form of construction to one where the interlock is controlled by the reset shaft and cost shaft includes providing said cost shaft 416 with the cam 418 similar to the cam 406. The interlocking bar 420 is elongated, being guided as before in the spaced guides 422 similar to the guides 400. This locking bar is not provided with any means adjacent the volume shaft 408, nor is said shaft provided with any cam such as is provided in the construction illustrated in Figure 11. The extension 414 of the reset shaft 376 is provided with the cam 412, and said cam is adapted to have cooperative engagement with the shoulder 424, similar to the shoulder 410, it being understood that the enlarged portion of the cam 412 clears the shoulder 424 when the registering mechanism 338 is set to zero position.

After liquid has been dispensed and it is desired to reset the indicator to zero position, rotation of the reset shaft 414 causes the cam to engage the shoulder 424 to raise the interlock bar 420. Raising the interlock bar 420 permits the dog 426, similar to the dog 402, to pivot about the point 428 and assume a vertical position where it will support the interlock bar in raised position when the enlarged portion of the cam 418 has been moved to supporting relation with the dog 426, at which time the shaft 416 has caused the cost indicating portion of the registering mechanism to be returned to zero position. When the reset shaft has reached its final position, the dog 412 will clear the shoulder 424 to permit the reset bar to be lowered upon rotation of the shaft 416 which is caused by any slight movement of the registering mechanism 338. The operation of the interlocking valve and Sylphon is the same as has been already described with respect to Figures 11, 12 and 13.

Referring now more particularly to the clock type of liquid dispensing apparatus illustrated in Figures 15 and 16, the apparatus consists essentially of the casing 430 in which is provided substantially the same operating mechanism as described with respect to the computer type of liquid dispensing apparatus shown in Figure 1, it being understood that there is a pump unit connected to a source of liquid supply (not shown), the pump being operated by a motor (not shown) provided with the switch 432, said switch being provided with the control arm 434 connected through the rod 436 to the switch control member 438, said switch control member being pivoted as at 440 to a suitable support in the casing and extending outwardly and being disposed adjacent the hose hook support 442.

The pump is connected to the inlet side of the meter 444 similar to the meter 62, the air separator 446 being connected to the inlet side of the meter, said air separator having the vapor exhaust line 450 extending to a raised portion of the housing. The outlet side of the meter is connected to the pipe 452 which extends upwardly and connects to a suitable visigauge (not shown) to which the hose 454 is connected, said hose being provided with the nozzle 456 having the dispensing valve 458 controlled by the lever 460 pivoted within the guard 462. Liquid passing through the meter is adapted to rotate the meter shaft 464 connected to the jack shaft 466 of the clock type of register, indicated generally at 468. This register may be substantially of the same construction as illustrated in application Serial No. 591,347 filed February 6, 1932.

The clock, register or indicator consists essentially of the spaced dials 470 suitably calibrated to indicate the number of gallons dispensed, and fractions thereof, the indications being made by the minute hands 472 adapted to rotate through 360 deg. for every gallon dispensed, the total indications for a single service being indicated by the hour hands 474 adapted to move through one unit (shown as gallons) over the clock face. The jack shaft 466 is journalled as at 476 and 478 in the frame 480, and is provided with the worm 482 adapted to mesh with a suitable worm gear 484 loosely mounted on the shaft 486, but secured thereto by means of the friction clutch plates 488. The worm gear is provided with the pinion 490 meshing with the pinion 492 mounted on the totalizer shaft 494, said shaft being likewise journalled in the frame 480 and being geared as at 496 to the totalizer 498. The shaft 486 is provided with the bevel gear 500 meshing with the bevel gear 502 mounted on the shaft 504, said shaft being provided with the clutch member 506 adapted to be engaged by the clutch member 508 mounted on the reset jack shaft 510 on which the reset knob 512 is disposed.

The outer ends of the shaft 486 extend outwardly of the dials 470, and the minute hands 472 are non-rotatably mounted on said shaft as at 514. The jack shaft 466 is provided with the worm 516 meshing with the pinion 518 loosely mounted on the shaft 520, but secured thereto through the friction clutch disks 522. The shaft 520 is provided with the pinions 524 and 526 meshing with the gears 528 and 530, said gears being provided with the sleeves 532 and 534 journalled on the shaft 486 and extending outwardly of their respective dials, the hour hands 474 being secured to the respective members 532 and 534.

The clutch plates 488 are provided with a shoulder 536 adapted to be engaged by the pawl 538 upon rotation of the gear 528 in a reset direction; in a registering direction the pawl 538 being adapted to slip over the shoulder 536. The pinion 528 is likewise provided with the pin 540 adapted in the zero position of the hands 472 and 474 to engage and be stopped by the vertical arm of the bell crank 542, said bell crank being pivoted in the frame 480, and when engaged by the pin 540 the horizontal arm 544 of the bell crank depresses the pin 546 to move the arm 548 of the lever 550 downwardly, thereby moving the lever in a counter-clockwise direction about its pivot 552 on the frame 480.

The outer arm 554 of the lever 550 is stopped in its uppermost position by engagement with the frame 480, and said arm is connected as at 556 to the rod 558, the lower end of said rod being secured as at 560 to the latch member 562 pivoted as at 564 to the plate 200 of the latch valve assembly 66. The latch valve assembly 66 is disposed in the pipe line 452, and is similar to the latch valve assembly described with respect to Figures 6 and 7. While the member 168 is illustrated for supporting the member 562, it of course is appreciated that this member is not necessary, though it is shown provided to relieve the clock mechanism from any load imposed by the spring 146 which is connected to the valve casing and to member 562. The clutch member 508 is connected by the member 566 to the rod 568 slidably mounted in the clock frame, and being connected as at 570 to the upwardly extending arm 572 of the switch control member 438.

In operation of this form of liquid dispensing apparatus, after the hose nozzle 456 has been removed from the support 442, the switch control member 438 can be moved upwardly to close the switch 432 to start the motor, which in turn operates the pump to supply liquid to the meter 444. Assuming the clock or register 468 to be in zero position, such as illustrated in Figure 15, movement of the switch control member 438 upwardly will move the rod 568 toward the left as viewed in Figure 15 to disengage the clutch member 508 from the member 506, thereby preventing tampering with the clock during dispensing operation. Passage of liquid through the meter will cause operation of the meter shaft 464, and as the clock was initially at zero, the plunger 196 will move outwardly beneath the member 562, removing the member 164 from beneath the member 562. Liquid then passes through the valve 66 through the pipe 452, hose 454, and outwardly of the nozzle 456, it being understood that the nozzle valve 458 is held open.

Passage of liquid through the meter will cause rotation of the meter shaft 464 to rotate the jack shaft 466. Rotation of the jack shaft 466 will cause rotation of the shaft 486 through the worm 482, the gear 484, and clutch member 488, causing movement of the minute hand 472 over the face of the dial. Rotation of the shaft 466 likewise causes the worm 516 to rotate the shaft 520 through the gear 518, and the clutch 522, thus causing the gears 524 and 526 to rotate the gears 528 and 530 to cause rotation of the hour hands 474 over the dial, it being understood that movement of the hour hands through one indication is made after the minute hands have moved through 360 deg. Rotation of the pinion 528 causes the pin 540 to rotate out of engagement with the bell crank 542, whereupon the spring 146 will move the lever 562 to supported position on the pin 196 which has been extended outwardly of its boss by passage of liquid through the valve 66.

After a predetermined amount of gasoline has been dispensed and the switch control member 438 moved downwardly to open the switch 432, the decrease of pressure in the pipe line 452 will cause the plunger 196 to be retracted and the spring 146 will cause downward movement of the lever 562 to a position in way of the plunger 196 to prevent any further liquid being dispensed through the valve 178 (Figure 6) should the switch 432 be again closed. Movement of the switch arm 438 downwardly to open the switch 432 will cause re-engagement of the clutch members 508 and 506, whereupon the reset knob 512 can be rotated to reset the clock to zero. Rotation of the shaft 510 causes the bevel gear 502 to rotate the bevel gear 500 to rotate the shaft 486 in a reverse direction from registering direction.

Thus, during resetting operation when the minute hand 474 overlies the hour hand 472, the shoulder 536 will pick up the pawl 538 to rotate the pinion 528, and thus the pinion 530 through the pinion 524, shaft 520 and pinion 526, to rotate the sleeves 532 and 534 until both hands are at the zero indication, at which time the pin 540 will have contacted the bell crank 542 to move the horizontal arm 544 thereof to contact the adjacent frame 480 to stop the hands at zero position. It is noted that rotation of the shaft 486 and the sleeve 534 does not cause rotation of the jack shaft 466 due to slippage at the clutches 484 and 522, so that the reset motion is not transmitted to the meter valve. Movement downwardly of the horizontal arm 544 will depress the pin 546, causing the lever 550 to raise the rod 558 to move the lever 562 out of blocking position with respect to the pin 196, whereupon the liquid dispensing apparatus is in position to again dispense liquid in a manner already described.

It is to be understood that we do not wish to be limited by the exact embodiments of the device shown which are merely by way of illustration and not limitation, as various and other forms of the device will of course be apparent to those skilled in the art without departing from the spirit of the invention or the scope of the claims.

What is claimed is—

1. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, a reset shaft operating member, a clutch adapted to connect said reset shaft operating member to said reset shaft, means controlled by the pressure of the liquid supplied to said meter for disengaging said clutch when the pump is operating, a valve in said discharge line, locking means for locking said valve in closed position after liquid has been discharged and the pump rendered inoperative, and means controlled by said register for rendering the locking means inoperative when the register is reset to zero.

2. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, a reset shaft operating member, a clutch adapted to connect said reset shaft operating member to said reset shaft, and means controlled by the pressure of the liquid supplied to said meter for disengaging said clutch when the pump is operating.

3. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, reset shaft operating means, a valve in said discharge line, locking means for locking said valve in closed position after liquid has been discharged and the pump rendered inoperative, and means controlled by said register for rendering the locking means inoperative when the register is reset to zero.

4. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, reset shaft operating means, a valve in said discharge line, locking means for locking said valve in closed position after liquid has been discharged and the pump rendered inoperative, and means controlled by said register for rendering the locking means inoperative when the register is reset to zero, said valve having means so constructed and arranged that reduction of pressure in the discharge line may occur to a predetermined quantity.

5. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, reset shaft operating means, a valve in said discharge line, locking means for locking said valve in closed position after liquid has been discharged and the pump rendered inoperative, and means controlled by said register for rendering the locking means inoperative when the register is reset to zero, said valve having means so constructed and arranged that reduction of pressure may occur in the discharge line to zero.

6. A valve assembly including a housing having a valve seat therein defining an inlet and an outlet chamber, a valve adapted to seat upon said seat, said valve being disposed in said inlet chamber, a stem member connected to said valve and being provided with a recess, a plunger member receiving said stem member and provided with a seating member, a spring in said recess and interposed between said stem member and said plunger member, a spring stiffer than said first named spring interposed between said housing and said seating member, said seating member having a portion spaced from said valve whereby fluid pressure may act on said valve in a seating direction, and a Sylphon connected to said portion and said housing, said seating member and said stem member having normally spaced shoulders permitting relative movement between said valve and said plunger member before said valve is unseated.

7. A valve assembly including a housing having a valve seat therein defining an inlet and an outlet chamber, a valve adapted to seat upon said seat, said valve being disposed in said inlet chamber, a stem member connected to said valve and being provided with a latching plunger extending outwardly of said housing, a spring interposed between said valve and said housing, and a Sylphon rigidly connected to said valve and said housing for unseating said valve against the action of said spring when a predetermined pressure is built up in said inlet chamber.

8. In liquid dispensing apparatus, the combination of a register having an initial registration, mechanism for resetting the register to said initial registration, delivery means for delivering liquid, pressure responsive means connected to said delivery means and adapted to be controlled by (means controlled by) said register to insure said register being at initial registration when liquid flow is initiated through said delivery means.

9. A liquid dispensing system including a pump and driving means therefor, a liquid meter for measuring the dispensed liquid, an indicator driven by the meter, and pressure means connected to said pump and operated by liquid pressure therefrom for preventing the resetting of said indicator while the driving means is driving the pump.

10. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, a reset shaft operating member, a clutch adapted to connect said reset shaft operating member to said reset shaft, means controlled by the pressure of the liquid supplied to said meter for disengaging said clutch when liquid is being dispensed, a valve in said discharge line, locking means for locking said valve in closed position after liquid has been discharged and the pump rendered inoperative, and means controlled by said register for rendering the locking means inoperative when the register is reset to zero.

11. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, a reset shaft operating member, a clutch adapted to connect said reset shaft operating member to said reset shaft, control means for the clutch adapted to open said clutch when said control means is operated to start said pump, a valve in said discharge line, locking means for locking said valve in closed position after liquid has been discharged and the pump rendered inoperative, and means controlled by said register for rendering the locking means inoperative when the register is reset to zero.

12. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, a reset shaft operating member, a clutch adapted to connect said reset shaft operating member to said reset shaft, control means for the clutch adapted to open said clutch when said control means is operated to start said pump, a valve in said discharge line, locking means for locking said valve in closed position after liquid has been discharged and the pump rendered inoperative, means controlled by said register for rendering the locking means inoperative when the register is reset to zero, said last named means including a lever connected to said valve, a bell crank disposed adjacent said lever, a pin movable between said bell crank and lever, and a member movable by the register engageable with said bell crank when said register is in predetermined position to move said bell crank, said pin and said lever to open said valve.

13. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, a reset shaft for said register, a reset shaft operating member, a clutch adapted to connect said reset shaft operating member to said reset shaft, control means for the clutch adapted to open said clutch when said control means is operated to start said pump, a valve in said discharge line, locking means for locking said valve in closed position after liquid has been discharged and the pump rendered inoperative, means controlled by said register for rendering the locking means inoperative when the register is reset to zero, said last named means including a lever connected to said valve, a bell crank disposed adjacent said lever, a pin movable between said bell crank and lever, and a member movable by the register engageable with said bell crank when said register is in predetermined position to move said bell crank, said pin and said lever to open said valve, said member being movable by said register to permit said valve to close and said locking means to lock said valve in closed position when said control means stops said pump.

14. In a valve assembly, the combination of a housing, a valve in said housing, a valve stem connected to said valve and extending outwardly of said housing, a latch member pivoted to said housing and movable in a plane normal to the axis of said valve stem, a spring for urging said latch member into a position in way of said valve stem to prevent extension of said stem from said housing whereby the valve would be seated, and a supporting member pivoted to said housing and normally urged toward said housing, said supporting member supporting said latching member out of blocking position when said valve stem is retracted, said supplemental member being movable by said valve stem to release said latch member to a supported position on said stem whereby upon retraction of said stem said latch member can drop to blocking position holding said supplemental member inoperative until said latch member has been raised above said supplemental member.

15. In a registering mechanism, the combination of a reset shaft, a jack shaft having a reset operating member thereon, clutch members on said shafts, a journal for said jack shaft, a spring interposed between said jack shaft and journal urging said jack shaft clutch member against said journal, a pressure housing, a clutch lever on said housing cooperating with the reset shaft clutch member and normally urging said reset clutch member into engagement with the other clutch member, and a flexible member in the pressure housing having means cooperating with said clutch lever for moving said lever to declutching position when pressure is applied to said flexible member, the jack shaft being movable against said spring to engage the clutch members at any time.

16. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, said register having means for indicating the volume of liquid dispensed and having other means for indicating the cost of the liquid dispensed, a volume shaft and a cost shaft cooperating respectively with the volume and price indications, a reset shaft for operating said other shafts to return the indicators to zero, interlock means for preventing dispensing of liquid until said indicators are at zero, and means controlled by said reset shaft and one of the other shafts for controlling said interlock.

17. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, said register having means for indicating the volume of liquid dispensed and having other means for indicating the cost of the liquid dispensed, a volume shaft and a cost shaft cooperating respectively with the volume and price indications, a reset shaft for operating said other shafts to return the indicators to zero, interlock means for preventing dispensing of liquid until said indicators are at zero, and means controlled by said reset shaft and one of the other shafts for controlling said interlock, said interlock including a slidable locking bar adapted to be raised to inoperative position by means on the reset shaft and supported in inoperative position by means on said other shaft when said register is initially operated.

18. In liquid dispensing apparatus, the combination of a pump adapted to be connected to a source of liquid supply, a meter the inlet side of which is connected to the outlet side of said pump, a discharge line connected to the outlet side of said meter, a register operated by the meter, the operation of the register being proportional to the amount of liquid dispensed, said register having means for indicating the volume of liquid dispensed and having other means for indicating the cost of the liquid dispensed, a volume shaft and a cost shaft cooperating respectively with the volume and price indications, a reset shaft for operating said other shafts to return the indicators to zero, interlock means for preventing dispensing of liquid until said indicators are at zero, and means controlled by said reset shaft and one of the other shafts for controlling said interlock, said interlock including a pivotally mounted lever adapted to be rotated by means on the other shaft, a slidably mounted lever adapted to be raised by means on said reset shaft, said last named levers being loosely connected whereby relative rotation may be had, but when said slidable lever is raised it will rotate the pivoted lever whereby the interlock is rendered inoperative when said register is returned to zero.

19. A liquid dispensing system including a pump and driving means therefor, a liquid meter for measuring the dispensed liquid, an indicator driven by the meter and having a predetermined initial position, and pressure means for preventing dispensing of liquid upon operation of the driving means when the indicator is in other than initial position.

20. A liquid dispensing system including a pump and an electric motor for driving the same, a switch through which the motor may be energized, a liquid meter for measuring the liquid dispensed, a resettable indicator driven by said meter having a predetermined initial position, and pressure means having resistant means operated upon operation of the switch for resisting resetting of the indicator while said switch is closed.

21. A liquid dispensing system including a pump and driving means therefor, a liquid meter for measuring the dispensed liquid, an indicator driven by the meter, and pressure means connected to said pump and operatively associated with said indicator, said pressure means receiving pressure from said pump, said pressure means being operated by reduction of pressure thereto whereby upon said reduction said indicator must be reset before delivery of liquid can be effected from said system.

22. In liquid dispensing apparatus, the combination of a register having an initial registration, mechanism for resetting the register to said initial registration, delivery means for delivering liquid, pressure means connected to said delivery means and operatively associated with said register, said pressure means controlling means operable upon decrease in pressure in said pressure means to prevent delivery of liquid from said delivery means until said register has been reset to a predetermined registration.

23. A liquid dispensing system including a pump and driving means therefor, a liquid meter for measuring the dispensed liquid, an indicator driven by the meter and having a predetermined initial position, and pressure means for preventing dispensing of liquid unless said indicator is in said predetermined initial position.

24. A liquid dispensing system including a pump and driving means therefor, a liquid meter for measuring the dispensed liquid, an indicator driven by the meter and having a predetermined initial position, and pressure means operated by the pressure in said system to control dispensing of liquid from said system, reduction of pressure in said system causing said pressure means to render said system inoperative until said indicator has been reset to said initial position.

25. A liquid dispensing system including a pump and driving means therefor, a liquid meter for measuring the dispensed liquid, an indicator driven by the meter and having a predetermined initial position, and pressure means operated by the pressure in said system to control dispensing of liquid from said system, reduction of pressure in said system causing said pressure means to render said system inoperative until said indicator has been reset to said initial position, said indicator having means cooperative with said pressure means to permit operation of said system until another reduction of pressure in said system occurs.

ROBERT J. JAUCH.
WILLIAM G. POLHAMUS.
ROSS H. ARNOLD.

CERTIFICATE OF CORRECTION.

Patent No. 2,160,459. May 30, 1939.

ROBERT J. JAUCH, ET AL.

It is hereby certified that error appears in the printed specification of the above numbered patent requiring correction as follows: Page 8, second column, line 63, claim 8, for "by (means controlled by) said" read by means controlled by said; and that the said Letters Patent should be read with this correction therein that the same may conform to the record of the case in the Patent Office.

Signed and sealed this 5th day of September, A. D. 1939.

(Seal)

Henry Van Arsdale,
Acting Commissioner of Patents.